United States Patent Office 3,322,246
Patented May 30, 1967

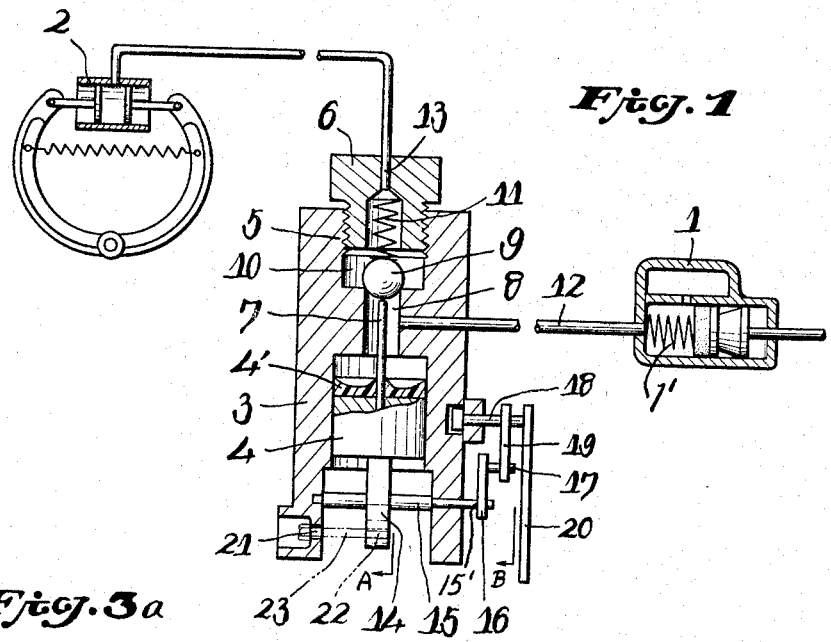
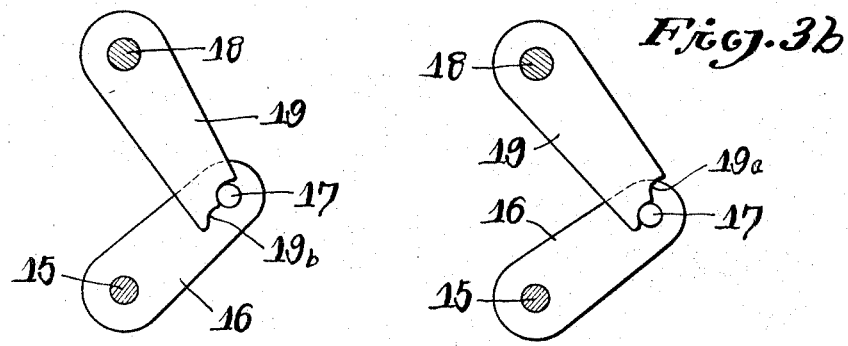
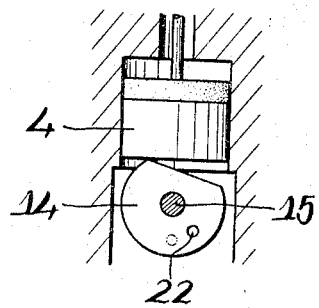

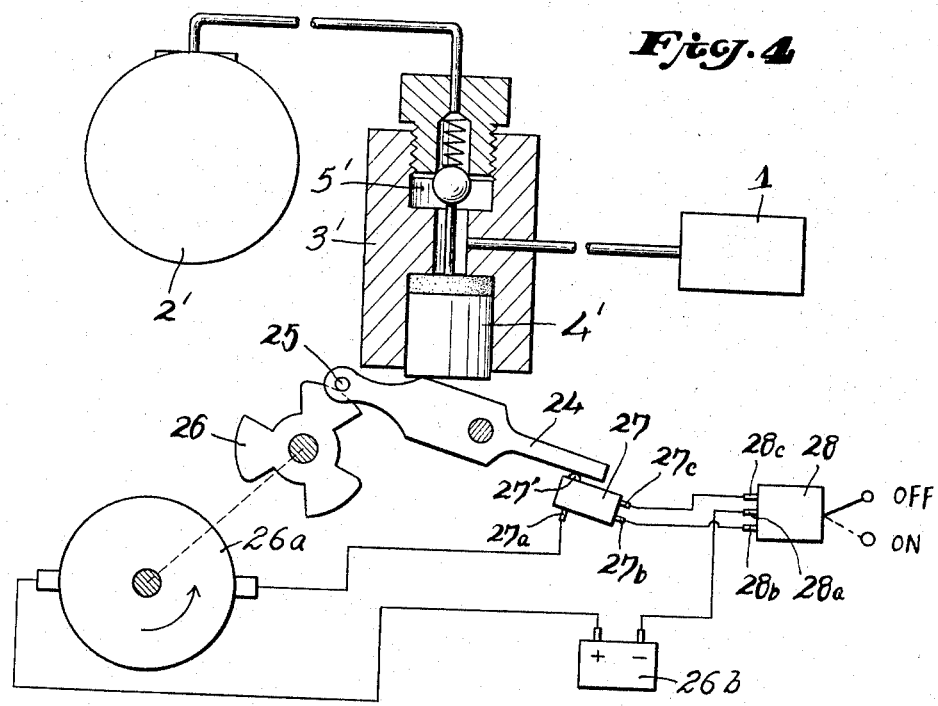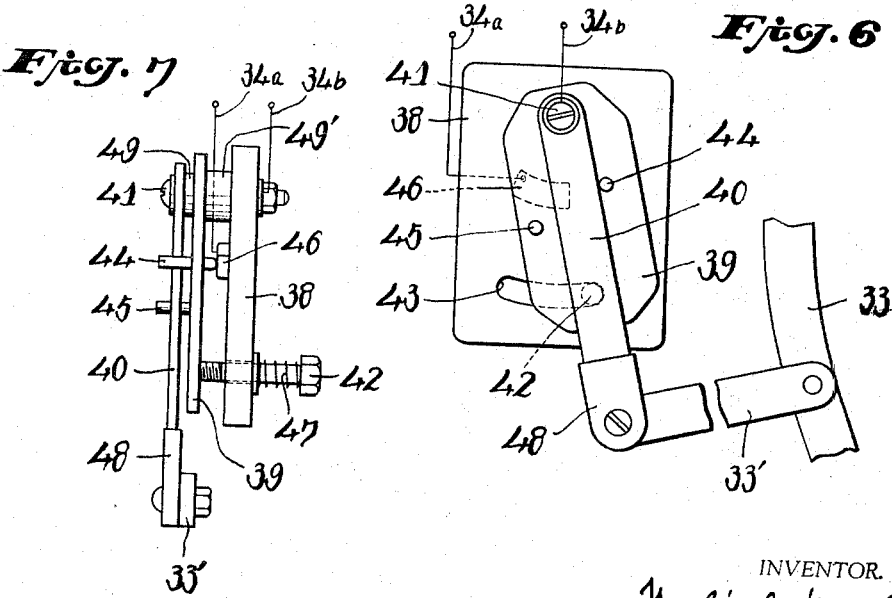

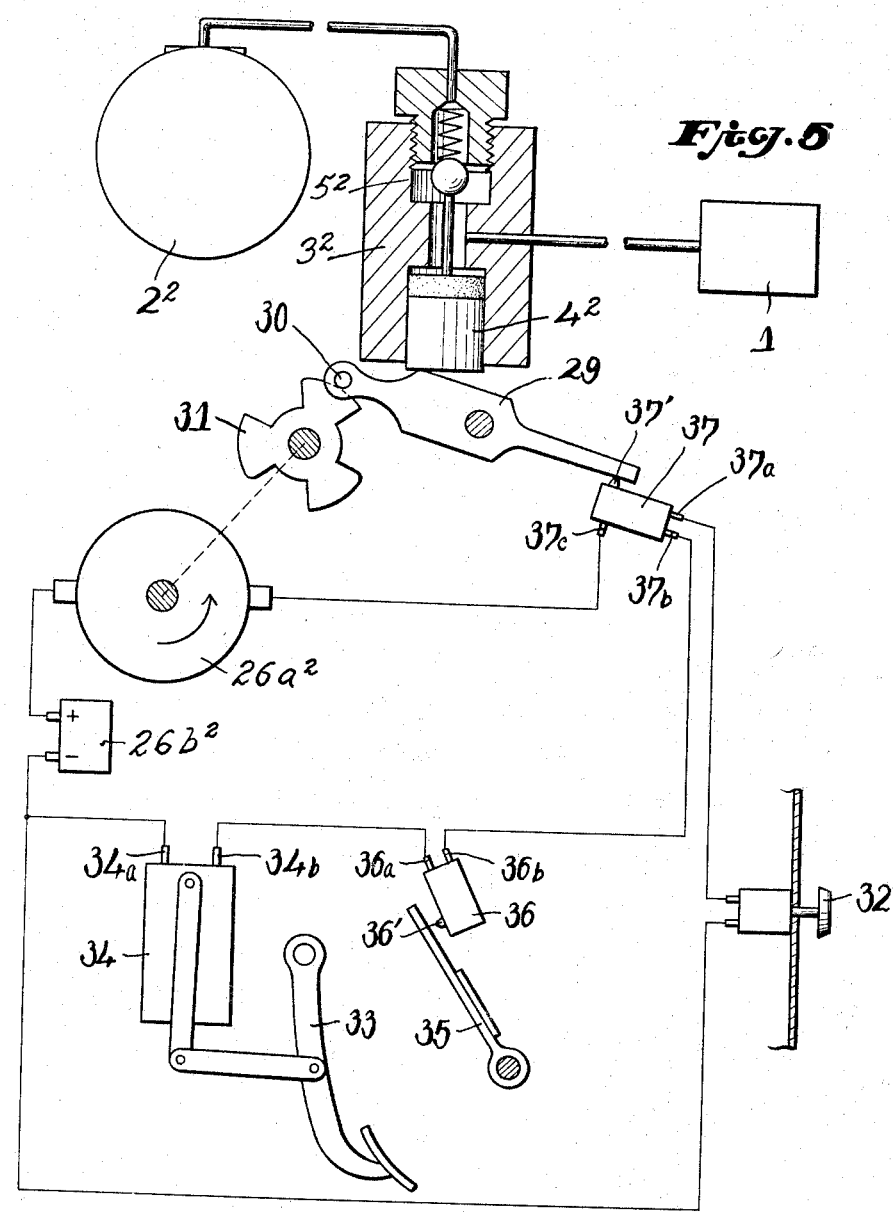

3,322,246
LOCKING DEVICE FOR AN AUTOMOTIVE HYDRAULIC BRAKE
Yoshisuke Noguchi, Urawa-shi, Japan, assignor of one-half to Shozo Takase, Kamakura-shi, Japan
Filed Oct. 19, 1964, Ser. No. 404,821
Claims priority, application Japan, May 22, 1964, 39/28,616
5 Claims. (Cl. 192—.049)

The present invention relates to a locking device for automotive hydraulic brakes operated by hydraulic pressure.

As for the conventional locking device of automotive brakes, constructions for holding the braking power are known, however, the mechanical construction could not be satisfactorily achieved heretofore, due to its handling difficulty, its complication, etc.

It is one object of the present invention to provide a locking device for automotive hydraulic brakes which comprises a simpler and more effective locking construction than previously known for conventional hydraulic brakes, in order to effectively hold the brake, even upon release of the driver's foot from the pedal.

By providing a check valve between the brake master cylinder and the brake wheel cylinder, a hydraulic pressure, generated by foot-operated transmission of pressure into the brake wheel cylinder, can be maintained by the check valve provided in the hydraulic pressure pipe even after the foot-operation has been terminated.

The check valve member comprises substantially a cylinder, a piston, push-rod and ball, and consequently, the present device can be easily attached to any type of conventional automobile.

The aforementioned device may be operated manually, or by manual-electric and automatic-electric-systems, and the operation thereof is relatively simple and easy.

It is another object of the present invention to provide a locking device for automotive hydraulic brakes, which comprises a mechanism, which is capable of keeping the automobile in the position where the brake is applied.

The driver is not required to push the brake-pedal down continuously, even when the car is stopped or parked on a steep upward or downward hill, as the brake is continuously applied in the present invention until the car is ready to be started.

With these and other objects in view which will become apparent in the following detailed description, the present invention will be clearly understood in connection with the accompanying drawings, in which:

FIGURE 1 is a sectional elevation of an embodiment of the check valve applicable to a device operated by hand;

FIG. 2 is a fragmentary axial section of the combined construction of the piston and the cam according to FIG. 1;

FIGS. 3a and 3b are fragmentary views of the combined construction of a cam-lever and a pin in two operative positions;

FIG. 4 is a sectional elevation of another embodiment of the check valve device applied to a manually operated electric system;

FIG. 5 is a sectional elevation of still another embodiment of a check-valve device applied to an electric-automatically operated system;

FIG. 6 is a front elevation of a particular type switch applied to the device operated by an electri-automatically operated system; and FIG. 7 is a side elevation of the switch disclosed in FIG. 6.

Referring now to the drawings, and in particular to FIG. 1, an embodiment of a check valve device applied to a manually operated system is disclosed. The check valve device, comprising a piston 4, a cylinder 3 in which the piston 4 reciprocates, a check valve member 5 and a lid 6 are, respectively, provided between a brake-master-cylinder 1 and a brake-wheel-cylinder 2.

The check valve member 5, disposed between the cylinder 3 and the lid 6, is equipped with a vertical recess 8.

An oil chamber 10 is provided in the upper portion of the cylinder 3 and forms at its bottom a valve seat leading to the recess 8 and a ball 9 is positioned on the valve seat and pressed by spring 11 provided in a central orifice in the lid 6.

An oil passage 12 leads into the vertical orifice 8 for supplying oil thereto from the brake-master-cylinder 1. In the central part of the lid 6 is provided an orifice 13 which communicates freely with the oil chamber 10 and with the brake-wheel-cylinder 2.

A rubber cup 4' is also provided on the upper surface of the piston 4 for arranging the necessary oil-seal and in the center thereof a pushing piston rod 7 is fixedly mounted, while the bottom surface of the piston 4 is supported by a cam 14. The pushing piston rod 7 projects into the vertical recess 8 and the upper end of the pushing piston rod 7 engages the bottom surface of the ball 9 which is lifted and lowered, respectively, during the reciprocating movement of the piston 4.

Now, by operation of the brake pedal (not shown), the hydraulic oil will be supplied from the brake-master-cylinder 1 to the brake-wheel-cylinder 2 by lifting the ball 9, without interference of the spring 11 and the brake is applied to the wheels of the automobile. On the other hand, even after the driver's foot has released the brake pedal, the brake effect is still maintained, since the oil chamber 10 is perfectly sealed by means of the ball 9, which is effected by the oil pressure generating from a counter-flow of the hydraulic oil and the spring force of the spring 11. At this moment, the brake pedal is returned to the normal position by the effect of a spring 1' provided in the brake-master-cylinder 1. Thus, upon elevating the piston 4, either a free or check relation between the brake-master-cylinder 1 and the brake-wheel-cylinder 2 is obtained.

FIGS. 1 to 3a and 3b show mechanical structural features of the device set forth above. The cam 14, having a flat portion on the circumference thereof, raises the piston 4, as indicated in FIG. 2, by means of rotation of the cam 14. A cam axle 15, rotatably supporting the cam 14, is axially mounted in opposite walls of downward projections of the cylinder 3 and one end of a lever 16 is turnably mounted on an extension 15' of the axle 15 adjacent one of the projections of the cylinder 3. A pin 17 is secured to the other end of the lever 16. Another axle 18 is rotatably mounted in the cylinder 3, which axle 18 is disposed parallel with the axle 15 and a lever 19 having cam end formations 19a and 19b, together with another lever 20 are turnably mounted on the axle 18.

The cam formations 19a and 19b are, respectively, provided on the cam lever 19, so that the pin 17 of the lever 16 can be brought into engagement with either one of the cam formations. Now, assuming that the piston 4 is disposed in its relatively lower position and has been locked, the pin 17 is held at the cam formation 19a of the lever 19 and the lever 16 remains in the position shown in FIG. 3a. In this case, the pin 17 is properly held at the cam formation 19a as long as no rotating action is applied to the axle 15.

If the driver wishes to release now the locking effect, the lever 20 is manually turned, so that the lever 19 will simultaneously rotate in counterclockwise direction.

At the same time, the lever 16 will accordingly rotate in clockwise direction and is stopped by the pin 17, which is rising to cam formation 19b, as indicated in FIG. 3b.

Due to the rotation of the lever 16 the cam 14 is likewise rotated, as indicated in FIG. 2, whereby the piston 4 is moved upwardly.

In this case, high pressure may be effected upon the ball 9. However, the surface of the cup 4', provided in the piston 4, is always subjected to normal pressure and, therefore, the cam axle 15 can easily rotate, so that the pin 17, can be moved into the cam portion 19b. If the brake is to be locked, the piston 4 is lowered and by operating the brake pedal, an extremely high pressure is applied to the surface of the cup 4', whereby severe frictional effects between the engaging surfaces of the piston 4 and of the cam 14 will occur. However, in accordance with the present invention, the engaging point between the cam 14 and the piston 4 is set off from a vertical plane extending through the axle 15 of the cam 14 (FIG. 2), and, accordingly, a heavy load may be exerted on the cam 14.

Consequently, upon rotating the lever 19 in the clockwise direction, the lever 16 is moved into the position disclosed in FIG. 3a, whereby the cam 14 can rotate easily. In order to prevent the lever 16 from rotating further in the counterclockwise direction, the lever 19 and lever 16 cross each other, as shown in FIG. 3b, so that the pin 17 cannot be displaced from the cam formation 19b.

Further, the present device can also be utilized for protecting the car from undesirable movement, by providing improvements in the mechanical design, for example, by providing a pin 23 which locks the cam 14 relative to the cylinder 3. For this purpose the pin 23 is inserted into recesses 21 and 22, respectively, provided in the cylinder 3 and in the cam 14, so that the cam 14 cannot rotate, preventing movement of the piston 4.

Referring now again to the drawing, and in particular to FIG. 4, an embodiment of a manually electrically operating system according to the present invention, is now disclosed.

The check valve member 5', the piston 4', and the cylinder 3' are substantially identical with the structure of FIG. 1. The piston 4 engages, however, a cam portion which is axially movable freely as in the previous embodiment.

A lever 24 having a cam portion is now employed in the present embodiment. The lever 24 comprises a pin 25 which engages the peripheral surface of a cam 26 and another end of the lever 24 engages a contact 27' of a switch 27. When the lock is released, a switch 28 is in the "off" position and terminals 28a and 28c are connected, and terminals 28a and 28b are connected in case the switch 28 is turned to the "on" position.

The switch 27 is designed such that the terminals 27a and 27c provided thereon are connected as soon as the lever 24 engages the contact 27' by the connection of the terminals 27a and 27b.

If the switch 28 is moved to the "on" position, the pin 25 of the lever 24 drops into the concave portion on the cam 26 as an electric motor 26a turns in the direction of the arrow due to closing of a circuit from an electric source 26b to the motor 26a to the terminal 27a, from there to the terminal 27b to the terminal 28b, the terminal 28a and back to the electric source 26b.

At this moment, the terminals 27a and 27b of the switch 27 are disconnected and the terminals 27a and 27c of the switch 27 are connected while the electrical circuit is in non-operating open position.

If the switch 28 is shifted to the "off" position, the pin 25 engages the outer peripheral part of the cam 26, because of rotation of the electric motor which is operated through the electric current fed from the electric source 26b to the terminal 28a, the terminal 28c, the terminal 27c, the terminal 27a, the motor 26a and back to the electric source 26b.

By shifting the switch 28 into "on" or "off" position, respectively, the piston 4' is moved downwardly by utilizing the liquid pressure from the brake master cylinder 1'. If now the switch 28 is secured close to the driver's seat, the locking or releasing operation of the brake can easily be performed.

Referring now again to the drawings, and in particular to FIG. 5, an embodiment is disclosed, in which the piston to FIG. 5, an embodiment is disclosed, in which the piston is automatically operated by an electrically automatically operated system. According to the present device, the locking mechanism is simply operated by pushing a button and the releasing of the mechanism is automatically performed by operating the clutch pedal and the accelerator, respectively.

A check valve member $5^2$, a piston $4^2$, a cylinder $3^2$ and a lever 29 engaging the piston $4^2$ are substantially identical with the corresponding members disclosed in FIG. 4. A particular type of a switch 34 designed substantially for connection only at a predetermined angle is provided on a clutch pedal 33 and the latter is also designed such as to provide the electric connection solely upon its returning movement.

The switch 34 is particularly designed such, that the locking of the brake is released only upon the returning movement of the clutch pedal 33, and accordingly, the brake would not be released, even if the clutch pedal 33 is pushed down by foot, since it only releases upon its returning movement, and the flow of electric current fed to the device is interrupted as soon as the clutch pedal 33 returns to the original position.

Referring now to FIGS. 6 and 7, the particular type of the above-mentioned switch 34 (FIG. 5) will now be described:

A movable plate 39 and a lever 40 are rotatably secured to a pivot 41 provided on a stationary basic plate 38 and washers 49 and 49' being arranged between the plate 38 and the plate 39 and between the plate 39 and the lever 40. The swinging movement of the movable plate 39 about the pivot may, however, be restricted within a slot 43 provided in the basic plate 38 by means of a pin 42 secured to the movable plate 39 and extending through the slot 43. The lever 40 can move about the area between pins 44 and 45 projecting from the movable plate 39 into the path of movement of the lever 40.

An excessive movement of the lever 40 is always transmitted to the movable plate 39, the moving area of which is limited by the slot 43. The pin 45 is not designed to contact the basic plate 38, however, the bottom part of the pin 44 extends to the basic plate 38, so as to be capable of contacting with a conducting plate 46 provided in the basic plate 38.

In order to facilitate the contact, a spring 47 is provided which surrounds the pin 42. On the other hand, one end of the lever 40, to which an insulating plate 48 is secured, is pivotally connected to a lever 33', which transmits the movement performed by the clutch pedal 33 to the lever 40 and the plate 39, respectively.

Further, the basic plate 38 and the movable plate 39 comprises, respectively, insulating material and electric conducting terminals 34a and 34b are, at the same time, provided on the pivot 41 and on the conducting plate 46.

Now, if the clutch pedal 33 is pushed downwardly, the lever 40 is caused to move on the movable plate 39 toward the left side (FIG. 6) and upon abutment of the lever 40 on the pin 45 the movable plate 39 will join the movement of lever 40 until the pin 42 stops at the left end of the slot 43. At this moment, a movement adjustment is necessary, so that an extreme point of the clutch pedal 33 should correspond with the aforementioned position. In this connection, the pin 44 and the conducting plate 46 are contacting each other, but no electric current is fed, since the lever 40 does not contact the pin 44, rather the pin 45.

Upon reducing pressure imparted to the clutch pedal 33, the lever 40 will move toward the right side and upon abutment with the pin 44, automatically causes the locked brake wheel cylinder to be released by the electric current fed through the pin 44 and conducting plate 46.

Further, if the clutch pedal 33 returns to the original position, the electric current feed is again disconnected, as the contact between the conducting plate 46 and the pin 44 is completely disconnected.

Also, when the accelerator 35 (FIG. 5) is in its original position, in which situation terminals 36a and 36b of a switch 36 are, respectively, disconnected by the pressure exerted by the knob 36', while terminals 36a and 36b are connected upon pushing down the accelerator 35, the pressure on the knob 36' of the switch 36 is thereby released.

When the pin 30, provided on one end of the lever 29, is disposed in the periphery of the cam 31 which elevates the piston 4, the other end of the lever 29 causes a pressing down of the knob 37' of switch 37.

If the push button switch 32 is operated for locking the mechanism, the electric circuit is closed from the electric source 26b² to the push switch 32, terminal 37a, the terminal 37c, the motor 26a² and back to the electric source.

Accordingly, by the rotation of motor 26a², the pin 30 drops in the concave portion of the cam 31. Consequently, the other end of the lever 29 is disengaged from the knob 37' of the switch 37, and the terminals 37b and 37c are connected instead of the terminals 37a and 37c.

For locking the brake wheel cylinder, the electrical circuit comprises the electric source 26b², to the terminal 34a, the terminal 34b, the terminal 36a, the terminal 36b, the terminal 37b, the terminal 37c, the motor 26a² and back to the electric source.

If pressure imparted to the clutch pedal 33 is gradually decreased with a simultaneous pushing operation on the accelerator 35, the respective contact points engage and disengage, respectively, and the pin 30 of the lever 29 is lifted to the periphery of the cam 31 by the rotation of the motor 26a², whereby the piston 42 is pushed up so as to open the valve member 5².

The locked brake wheel cylinder is thus released, upon starting the operation of the vehicle in the conventional manner.

Accordingly, by repeating the operation set forth above, the mechanism can be used repeatedly.

Furthermore, in case the device is utilized in an automobile without a clutch pedal, the terminal 36a of the switch 36 is directly connected to the electric source, in place of adapting the particular type of switch.

While I have disclosed several embodiments of the present invention, it is to be understood that these embodiments are given by example only and not in a limiting sense, the scope of the present invention being determined by the objects and the claims.

What I claim is:

1. In combination with a hydraulic brake system for automotive vehicles, a means for retaining the fluid in said brake system, the latter comprising
a brake master cylinder and brake wheel cylinders,
a fluid line between said brake master cylinder and said brake wheel cylinders,
means for retaining fluid under pressure in said fluid line, including a chack valve member,
said check valve member comprising a cylinder the longitudinal axis of which is vertically oriented,
said cylinder having an upper and lower portion,
said lower portion having an open bottom end,
a piston disposed in said lower portion and axially and vertically movable freely therein and through said open bottom end of said lower portion of said cylinder so that said piston can be removed from said open bottom end,
said upper portion of said cylinder defining a chamber and the latter forming a valve seat at its bottom,
said cylinder defining further a vertical recess providing communication between said lower portion of said cylinder and said chamber,
a spring biased ball sitting on and urged onto said valve seat,
said fluid line feeding from said brake master cylinder to said vertical recess,
a pushing piston rod secured to the top of and axially movable with said piston, and extending axially through said vertical recess for engagement with the bottom surface of said ball,
cam means engaging the bottom face of said piston providing a sole means for supporting and retaining said piston in position within said lower portion of said cylinder and providing a lower abutment for supporting said piston,
said piston being moved downwardly solely by gravity and fluid pressure against said cam means,
said cam means operable for lifting said piston and, thereby, by means of said pushing piston rod lifting said ball from its valve seat in the open position of said check valve member, and
said pushing piston rod thus lifting said ball from its seat by moving axially.

2. In combination with a hydraulic brake system for automotive vehicles, a means for retaining the fluid in said brake system, the latter comprising
a brake master cylinder and brake wheel cylinders,
a fluid line between said brake master cylinder and said brake wheel cylinders,
means for retaining fluid under pressure in said fluid line, including a check valve member,
said check valve member comprising a cylinder,
a piston axially movable in said cylinder,
said cylinder defining a chamber and the latter forming a valve seat at its bottom,
said cylinder defining further a vertical recess providing communication between said cylinder and said chamber,
a spring biased ball sitting on and urged onto said valve seat,
said fluid line feeding from said brake master cylinder to said vertical recess,
a pushing piston rod secured to the top of and axially movable with said piston, and extending axially through said vertical recess for engagement with the bottom of said ball,
cam means engaging the bottom face of and lifting said piston and, thereby, by means of said pushing piston rod lifting said ball from its valve seat in the open position of said check valve member, and
said pushing piston rod thus lifting said ball from its seat by moving axially,
said cam means comprises
a cam disc having a flat circumferential portion and being rotatable in said cylinder about a first axle disposed perpendicularly to the longitudinal axis of said cylinder,
a first lever turnably mounted at one of its ends on an extension of said axle,
a pin secured to the other end of said lever,
a second axle rotatably mounted in said cylinder and disposed parallel to said first axle,
a second lever having two cam end formations and turnably mounted on said second axle,
a third lever mounted on said second axle and turning jointly with said second lever,
said two cam end formations being engaged selectively by said pin depending upon the required piston position, thereby lifting said ball from its seat and retaining said ball on its seat, respectively.

3. The combination, as set forth in claim 1, wherein said cam means comprises
a lever having a cam portion and pivotally mounted intermediate its ends, a cam having a peripheral surface including a range of larger diameter and a range of smaller diameter,
a pin extending from said lever and engaging said peripheral surface,
a first switch having a contact adapted to engage one end of said lever,
manually operated switch means operatively connected with said first switch,
said first switch has three terminals, and
a motor and an electric source in series with said first switch and said switch means to close a circuit upon shifting said switch means into an "ON" position, to operate said motor and moving said pin into engagement with said range of smaller diameter of said cam, in order to permit lowering of said ball to its seat.

4. The combination, as set forth in claim 3, wherein said manually operated switch means comprises
a second switch settable into an "OFF" and an "ON" position, respectively, and operatively connected with said first switch.

5. The combination, as set forth in claim 3, wherein said manually operated switch means comprises
a push button switch closing said circuit in the normal position of a clutch pedal and of a gas pedal, respectively, such that said circuit is opened upon pushing down said clutch pedal and said gas pedal, respectively.

References Cited

UNITED STATES PATENTS

| | | | |
|---|---|---|---|
| 1,953,242 | 4/1934 | Leeb et al. | 192—13 |
| 2,030,288 | 2/1936 | Freeman | 192—13 |
| 2,217,141 | 10/1940 | Sprenkle | 192—13 |
| 2,220,465 | 11/1940 | Spotz | 192—13 |
| 2,223,717 | 12/1940 | Coffman | 192—13 |
| 2,727,599 | 12/1955 | Melfi | 192—.049 |

BENJAMIN W. WYCHE, III, *Primary Examiner.*

DAVID J. WILLIAMOWSKY, *Examiner.*